United States Patent [19]

Kaneyuki

[11] Patent Number: 4,651,082
[45] Date of Patent: Mar. 17, 1987

[54] GENERATING APPARATUS WITH AN ADJUSTABLE SPEED CHANGE MECHANISM

[75] Inventor: Kazutoshi Kaneyuki, Himeji, Japan

[73] Assignee: Mitsubishi Denki Kabushiki Kaisha, Tokyo, Japan

[21] Appl. No.: 846,639

[22] Filed: Apr. 1, 1986

[30] Foreign Application Priority Data

Apr. 3, 1985 [JP] Japan .................................. 60-49749

[51] Int. Cl.⁴ ...................... H02P 9/04; H02P 15/00; F16H 15/16
[52] U.S. Cl. ........................................ 322/29; 74/191; 74/796; 310/83; 322/30; 322/41
[58] Field of Search ..................... 322/40-43, 322/29, 30; 310/83; 74/796, 190.5, 191, 194, 196, 198, 199, 209

[56] References Cited

U.S. PATENT DOCUMENTS

| 2,810,844 | 10/1957 | Morrill .............................. | 322/40 X |
| 2,891,213 | 6/1959 | Kern ................................. | 322/40 X |
| 4,232,561 | 11/1980 | Kashihara et al. ............... | 74/796 X |
| 4,310,768 | 1/1982 | Colley .............................. | 310/83 X |

FOREIGN PATENT DOCUMENTS 0163855  9/1983  Japan .................................. 74/796

Primary Examiner—R. J. Hickey
Attorney, Agent, or Firm—Leydig, Voit & Mayer

[57] ABSTRACT

A generating apparatus for charging the battery of an automobile or the like is disclosed. A charging generator has an input shaft on which is mounted a driven pulley which is belt-driven by the drive pulley of an automobile engine. An adjustable speed change mechanism in the form of a planetary cone reduction gear is housed inside the driven pulley. The reduction gear transmits drive force from the driven pulley to the input shaft of the charging generator. A reduction ratio adjustment mechanism automatically decreases the ratio of the rotational speed of the input shaft to the rotational speed of the driven pulley as the rotational speed of the driven pulley increases so as to maintain the rotational speed of the input shaft substantially constant. In a preferred embodiment, the reduction ratio adjustment mechanism comprises a centrifugal governor.

3 Claims, 3 Drawing Figures

GENERATING APPARATUS WITH AN ADJUSTABLE SPEED CHANGE MECHANISM

BACKGROUND OF THE INVENTION

The present invention relates to a generating apparatus for charging the battery of an automobile engine, and more particularly to a generating apparatus with an adjustable speed change mechanism which enables the charging generator to be run at a varying speed with respect to the rotational speed of the engine.

In a typical automobile engine, a charging generator is belt-driven by a drive pulley mounted on the crankshaft of the engine. The input shaft of the charging generator has a pulley mounted thereon which is drivingly connected to the drive pulley by a belt. The pulley ratio of the drive pulley and the pulley mounted on the input shaft of the charging generator is constant, and is generally set so that the rotational speed of the charging generator is 2–3 times the rotational speed of the drive pulley. By so setting the pulley ratio, the charging generator can produce adequate electrical power even when the engine is rotating at a low speed, such as when it is idling.

However, when the engine is operating at high speeds, the rotational speed of the charging generator is still 2–3 times that of the drive pulley, and at high rotational speeds, the output produced by the charging generator reaches a point of saturation. Namely, in high speed ranges, an increase in input power to the charging generator produces almost no increase in the electrical output power, which means that the efficiency of the charging generator becomes very low at high speeds. This reduction in generating efficiency decreases the fuel efficiency of the engine as a whole and is thus undesirable.

SUMMARY OF THE INVENTION

It is an object of the present invention to overcome the above-described problem of conventional charging generators and to provide a generating apparatus for an automobile engine whose rotational speed can be kept low and whose generating efficiency can be kept high when the engine is running at a high speed.

In the present invention, an adjustable speed change mechanism is provided inside a driven pulley which is mounted on the input shaft of a charging generator and which is belt-driven by a drive pulley of an engine. The speed change mechanism is connected between the two so as to transmit rotational force from the driven pulley to the input shaft. The driven pulley also houses a reduction ratio adjusting mechanism which adjusts the reduction ratio of the speed change mechanism. In a preferred embodiment, the adjusting mechanism is operated by centrifugal force and acts to automatically change the ratio of the rotational speeds of the input shaft and the driven pulley as the rotational speed of the driven pulley increases so that the rotational speed of the input shaft of the charging generator can be kept at a low level at which the generating efficiency is good.

BRIEF DESCRIPTION OF THE DRAWINGS

In the drawings, the same reference numerals indicate the same parts.

DESCRIPTION OF THE PREFERRED EMBODIMENT

Figure 1:
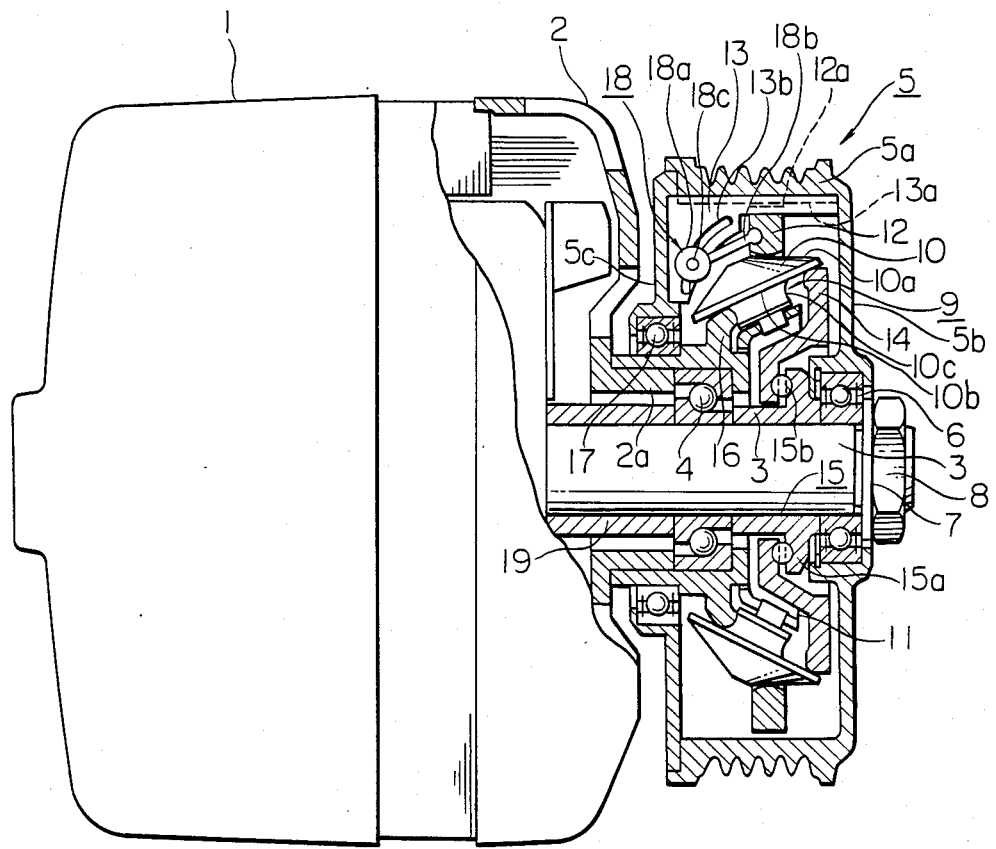
FIG. 1 is a partially cross-sectional side view of an embodiment of a generating apparatus according to the present invention.

Hereinbelow, an embodiment of a generating apparatus according to the present invention will be described while referring to the accompanying drawings. In this embodiment, the generating apparatus is used to charge the battery of an automobile. As shown in FIG. 1, which is a partially cross-sectional side view of this embodiment, the generating apparatus includes a charging generator 1 which has a front cover 2 and a rotating input shaft 3 which is rotatably supported by a tubular support portion 2a of the front cover 2 with a ball bearing 4. The charging generator 1 is rigidly secured to a stationary portion of the unillustrated engine of the automobile. A rotating input member in the form of a pulley 5 is rotatably supported by the input shaft 3 so as to be able to rotate with respect thereto. The pulley 5 comprises a cylindrical casing 5a which is closed off at one end by an annular wall portion 5b which is integrally formed with the casing 5a and an annular, removable end plate 5c which is secured to the casing 5a by suitable means and which closes off the other end of the casing 5a. The pulley casing 5a has grooves formed in its outer surface for a belt which drivingly connects it to the drive pulley of the unillustrated engine. The wall portion 5b of the pulley casing 5a is rotatably supported on the input shaft 3 by a ball bearing 6. The pulley 5 is prevented from moving in the axial direction of the input shaft 3 by a washer 7 and a nut 8 which is mounted on a threaded portion at the outer end of the input shaft 3 and by a cylindrical spacer 19 which fits over the opposite end of the input shaft 3.

Between the input shaft 3 and the pulley casing 5a is an adjustable, stepless, frictional speed change mechanism in the form of a planetary cone reduction gear 9 which transmits drive force from the pulley 5 to the input shaft 3 at an adjustable speed. The planetary cone reduction gear 9 has a plurality of stemmed planetary cones 10 which are rotatably mounted by their stems on a saucer-shaped cone support ring 11 which surrounds the input shaft 3 and can rotate with respect thereto. Each of the cones 10 has a first frictional transmission surface 10a which forms the top surface of the cone 10, a second frictional transmission surface 10b which forms the base of the cone 10, and a third frictional transmission surface 10c which forms the periphery of the stem of the cone 10. The axis of each cone 10 is sloped with respect to the axis of the input shaft 3 so that a line which is parallel to the axis of the input shaft 3 can be drawn from the vertex of the cone 10 to its base along its top surface. The first frictional transmission surface 10a of each cone 10 frictionally engages with the inner surface of a speed change ring 12 which is concentrically disposed with respect to the input shaft 3. The speed change ring 12 has a plurality of projections 12a formed on its outer periphery, and these projections 12a fit into channels 13a formed in a plurality of longitudinally-extending plates 13 which are secured to the inner surface of the pulley casing 5a and the end plate 5c at intervals in the circumferential direction. The channels 13a in the plates 13 prevent the speed change ring 12 from rotating with respect to the pulley casing 5a so that the rotation of the pulley 5 will be transmitted to the speed change ring 12, but at the same time they allow the speed change ring 12 to slide in the axial direction of the pulley 5. Each of the longitudinally-extending plates 13 has an arcuate slot 13b formed therein which extends outwards in the direction away from the input shaft 3.

The second frictional transmission surface 10b formed on the base of each cone 10 is in frictional engagement with the outer periphery of an input ring 14 which surrounds the input shaft 3. The input ring 14 is drivingly connected to the input shaft 3 by a transmission mechanism 15 comprising a first race 15a which is secured to the input shaft 3 and a plurality of balls 15b. The balls 15b are held between the undulating surface of the first race 15a and a similar undulating surface of a second race which is formed on the inner portion of the input ring 14. When the input ring 14 is rotated, the transmission mechanism 15 exerts a torque on the input shaft 3 which causes it to rotate together with the input ring 14.

The third frictional transmission surface 10c of each planetary cone 10 is in frictional engagement with the outer peripheral surface of a generally cylindrical stationary guide ring 16 which is secured to the tubular support portion 2a of the front cover 2 of the generator 1. When the planetary cones 10 are caused to rotate about their axes by the rotation of the speed change ring 12, the frictional engagement betwen the stationary guide ring 16 and the third frictional transmission surfaces 10c causes the planetary cones 10 to revolve about the axis of the input shaft 3. The stationary guide ring 16 rotatably supports the end plate 5c of the pulley 5 through a ball bearing 17.

The reduction ratio of the reduction gear 9 can be adjusted by moving the speed change ring 12 in the axial direction of the input shaft 3, and this is accomplished by a reduction ratio adjustment mechanism in the form of a centrifugal governor 18. The centrifugal governor 18 comprises a plurality of weights 18a each of which is supported in one of the slots 13b formed in each of the longitudinally-extending plates 13 so as to be able to slide therein. Each of the weights 18a is connected to the speed change ring 12 by an arm 18b which has one end pivotably connected to the speed change ring 12 and the other end pivotably mounted on a pin 18c which passes through the center of the corresponding weight 18a. The slots 13b are sloped so that when centrifugal force moves the weights 18a outwards away from the input shaft 3, the weights 18a will at the same time be moved in the longitudinal direction of the input shaft 3, pushing the speed change ring 12 in the direction away from the vertices of the planetary cones 10.

Figure 2:
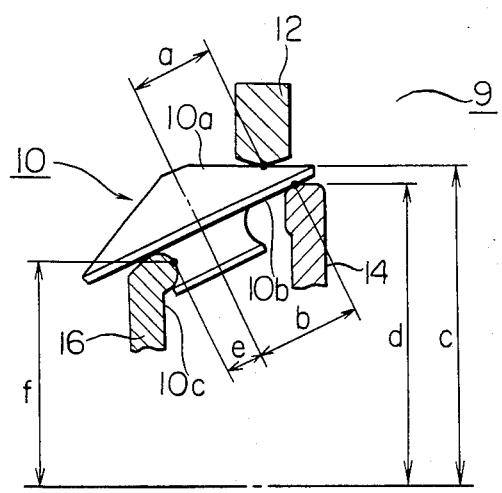
FIG. 2 is a cross-sectional view of a portion of the planetary cone reduction gear of FIG. 1, illustrating the effective radii of the components of the reduction gear.

FIG. 2 illustrates the effective radii of the various components of the reduction gear 9. The relationship between these radii determines the ratio of the rotational speed N2 of the input shaft 3 to the rotational speed N1 of the pulley 5, which is expressed by the following formula:

$$N2/N1 = c(ed+fb)/d(ec+fa)$$

wherein
a is the distance from the axis of each cone 10 to the point of contact between the first frictional transmission surface 10a of each cone 10 and the speed change ring 12;

b is the distance from the axis of each cone 10 to the point of contact between the second frictional transmission surface 10b and the input ring 14;

c is the distance from the axis of the input shaft 3 to the point of contact between the first frictional transmission surface 10a of each cone 10 and the speed change ring 12;

d is the distance from the axis of the input shaft 3 to the point of contact between the second frictional transmission surface 10b of each cone 10 and the input ring 14;

e is the distance from the axis of each cone 10 to the point of contact between the third frictional transmission surface 10c and the stationary guide ring 16; and f is the distance from the axis of the input shaft 3 to this same point of contact.

As the values of b through f are fixed, the ratio of N2/N1 can be changed by changing the value of a, i.e., by moving the speed change ring 12 in the axial direction of the input shaft 3. In the present embodiment, the dimensions are such that N2/N1 is approximately 2-3 when the speed change ring 12 contacts the planetary cones 10 near their vertices and is approximately 1 when it contacts the planetary cones 10 near their bases. This ratio can be varied continuously between these two values by moving the speed change ring 12 in the axial direction.

The operation of this apparatus is as follows. When the unillustrated engine is operated, the drive pulley mounted on the crankshaft of the engine transmits drive force to the pulley 5 through a belt, and the pulley 5 is caused to rotate. The engagement between the channels 13a of the longitudinally-extending plates 13 and the projecting portions 12a of the speed change ring 12 causes the speed change ring 12 to rotate together with the pulley 5 as a single body. The frictional engagement between the inner surface of the speed change ring 12 and the first frictional transmission surfaces 10a of the planetary cones 10 causes the planetary cones 10 to rotate on their axes. At the same time, due to the frictional engagement between the third frictional transmission surfaces 10c and the stationary guide ring 16, the planetary cones 10 revolve about the input shaft 3, performing planetary motion. The frictional engagement between the second frictional transmission surfaces 10b and the input ring 14 causes the input ring 14 to rotate about the axis of the input shaft 3, and the rotation of the input ring 14 is transmitted to the input shaft 3 by the transmission mechanism 15, causing the input shaft 3 to rotate at the same speed as the input ring 14. When the input shaft 3 rotates, the charging generator 1 generates electricity which is used to charge the battery of the automobile In a planetary cone reduction gear of the type employed in this embodiment, the planetary motion of the planetary cones 10 produces a longitudinally-directed biasing force on the speed change ring 12 which pushes it towards the vertices of the planetary cones 10. On the other hand, when the pulley 5 rotates, centrifugal force acts on the weights 18a of the centrifugal governor 18, forcing the weights 18a to slide outwards in the slots 13b in which they are mounted. Because of the arcuate shape of the slots 13b, the outwards movement of the weights 18a exerts a longitudinally-directed force on the speed change ring 12 through the arms 18b which is opposite in direction to the above-described biasing force acting on the speed change ring 12.

When the rotational speed of the pulley 5 is low, the biasing force acting on the speed change ring 12 is greater than the force exerted on it by the weights 18a of the centrifugal governor 18, and the speed change ring 12 contacts the planetary cones 10 near their vertices where the ratio of N2/N1 is a constant value of 2-3. However, if the rotational speed of the pulley 5 increases, at a certain speed, the longitudinally-directed force on the speed change ring 12 resulting from the centrifugal force acting on the weights 18a will overcome the biasing force acting on the speed change ring 12, and the speed change ring 12 will be pushed in the direction away from the vertices of the planetary cones 10, reducing the ratio of N2/N1 and maintaining the rotational speed of the input shaft 3 substantially constant. The speed change ring 12 will move to a point along the planetary cones 10 where the biasing force acting on it balances the longitudinal force exerted on it by the weights 18a. If the rotational speed of the pulley 5 is further increased, the centrifugal force acting on the weights 18a will likewise increase, pushing the speed change ring 12 farther away from the vertices, reducing the ratio of N2/N1, and maintaining the rotational speed of the input shaft 3 substantially constant despite the increase in the rotational speed of the pulley 5. When the speed change ring 12 reaches the ends of the planetary cones 10 near their bases, the weights 18a will abut against the outer ends of the slots 13b, preventing the further movement of the speed change ring 12 in the longitudinal direction. At this point, the ratio N2/N1 is approximately 1 and will remain so for further increases in the rotational speed of the pulley 5.

When the rotational speed of the pulley 5 is decreased from this point, the centrifugal force acting on the weights 18a will decrease, and the biasing force acting on the speed change ring 12 will move the speed change ring 12 towards the vertices of the planetary cones 10 until the biasing force balances the longitudinally-directed force exerted by the weights 18a. The value of the ratio N2/N1 will therefore increase, thereby maintaining the rotational speed of the input shaft 3 substantially constant despite the decrease in rotational speed of the pulley 5.

Figure 3:
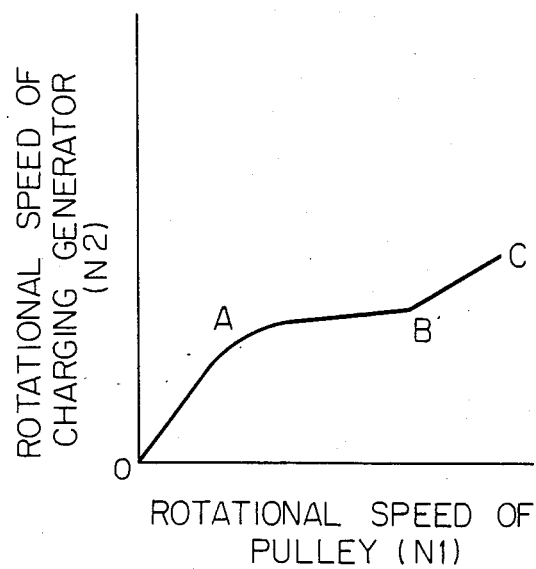
FIG. 3 is a graph illustrating the relationship between the rotational speeds of the pulley and the charging generator.

The relationship between the rotational speeds of the input shaft 3 and the pulley 5 is illustrated graphically in FIG. 3. When the rotational speed of the pulley 5 is low, in region OA of the graph, the ratio of N2 to N1 is a constant value of 2-3. When the rotational speed of the pulley 5 reaches a certain value, corresponding to A on the curve, the centrifugal force exerted on the weights 18a begins to overcome the biasing force acting on the speed change ring 12, and if the rotational speed of the pulley 5 increases beyond this point, the speed change ring 12 is moved away from the vertices of the cones 10, reducing the ratio of N2 to N1, and maintaining the rotational speed of the input shaft 3 substantially constant in the region AB of the curve. When the rotational speed of the pulley 5 reaches the point corresponding to point B, the speed change ring 12 has been moved as far as possible from the vertices of the planetary cones 10 and can move no farther. From this point, no further decreases in the ratio of N2 to N1 can take place, and for further increases in the rotational speed of the pulley 5, in region BC of the graph, the ratio of N2 to N1 remains constant at approximately 1.

Accordingly, in the high speed range, the input shaft 3 rotates only as fast as the pulley 5, and the charging generator 1 can be driven at a suitable speed at which its generating efficiency is high and its output does not saturate, resulting in an increase in the fuel efficiency of the engine as a whole.

In the above-described embodiment, a centrifugal governor 18 was used as a mechanism for adjusting the reduction ratio of the planetary cone reduction gear 9, but it is possible to use other types of mechanism for adjusting the position of the speed change ring 12 and obtain the same effects. For example, a hydraulic cylinder or a push-pull solenoid could be used to move the speed change ring 12.

Furthermore, although a pulley 5 was shown as a rotating member for transmitting input force to the input shaft 3 of the charging generator 1, the use of sprockets, gears, or other suitable means is also possible.

What is claimed is:

1. A generating apparatus comprising:
    a charging generator having a rotating input shaft;
    a rotating input body adapted to be connected to a motor so as to be rotated thereby, said rotating input body comprising a cylindrical body surrounding said input shaft;
    an adjustable speed change mechanism comprising a planetary cone reduction gear housed within said rotating input body and operatively associated with said rotating input body and said input shaft of said charging generator so as to transmit rotational force from said rotating input body to said input shaft, said planetary cone reduction gear comprising:
        a cone support ring mounted on said input shaft and adapted to rotate with respect thereto,
        a plurality of planetary cones having stems which are rotatably mounted on said cone support ring, the axis of each of said planetary cones being disposed such that a line which is parallel to said input shaft can be drawn from the vertex of each cone to its base along its top surface,
        a stationary guide ring which surrounds said input shaft and frictionally engages the peripheral surfaces of the stems of said planetary cones,
        a speed change ring surrounding said input shaft and having an inner surface frictionally engaging the top surfaces of said planetary cones, said speed change ring supported by said rotating input body so as to rotate together with said input body and adapted to move in the axial direction of said input body with respect thereto,
        an input ring which surrounds said input shaft, the outer peripheral surface of which is in frictional engagement with the bases of said planetary cones, and
        means for transmitting the rotation of said input ring to said input shaft; and
    means for adjusting the reduction ratio of said speed change mechanism to decrease the ratio of the rotational speed of said input shaft to the rotational speed of said input body as the rotational speed of said input body increases.

2. A generating apparatus as claimed in claim 1, wherein said means for adjusting the reduction ratio of said speed change mechanism comprises a centrifugal governor.

3. A generating apparatus as claimed in claim 2, wherein said centrifugal governor comprises:
    a weight which is supported by said rotating input body as as to be able to slide along an arcuate path away from said input shaft; and
    an arm which has one end pivotably connected to said weight and the other end pivotably conected to said speed change ring.

* * * * *